(12) United States Patent
Sigler et al.

(10) Patent No.: US 8,963,042 B2
(45) Date of Patent: Feb. 24, 2015

(54) WELDING LIGHT METAL WORKPIECES BY REACTION METALLURGY

(75) Inventors: David R. Sigler, Shelby Township, MI (US); James G. Schroth, Troy, MI (US); Xiaohong Q. Gayden, West Bloomfield, MI (US); Yen-Lung Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1259 days.

(21) Appl. No.: 12/420,927

(22) Filed: Apr. 9, 2009

(65) Prior Publication Data

US 2010/0258537 A1    Oct. 14, 2010

(51) Int. Cl.
| | | |
|---|---|---|
| *B23K 9/00* | (2006.01) | |
| *B23K 13/01* | (2006.01) | |
| *B23K 31/02* | (2006.01) | |
| *B23K 20/02* | (2006.01) | |
| *B23K 20/16* | (2006.01) | |
| *B23K 20/227* | (2006.01) | |
| *B23K 20/233* | (2006.01) | |

(52) U.S. Cl.
CPC .............. *B23K 20/023* (2013.01); *B23K 20/16* (2013.01); *B23K 20/2275* (2013.01); *B23K 20/233* (2013.01); *B23K 20/2336* (2013.01); *B23K 2201/18* (2013.01); *B23K 2203/08* (2013.01); *B23K 2203/10* (2013.01); *B23K 2203/20* (2013.01)
USPC ............................. 219/118; 219/617; 228/165

(58) Field of Classification Search
USPC .......... 228/164, 165, 193, 197, 198; 219/118, 219/617; 428/650, 674
See application file for complete search history.

(56) References Cited

U.S. PATENT DOCUMENTS

| 2,366,168 | A | * | 1/1945 | Bakarian ..................... 228/235.3 |
|---|---|---|---|---|
| 2,908,801 | A | * | 10/1959 | Arthur ............................ 219/74 |
| 3,121,785 | A | * | 2/1964 | Terrill et al. .................. 219/118 |
| 4,094,453 | A | * | 6/1978 | Cook et al. .................... 228/265 |
| 4,331,286 | A | | 5/1982 | Miyazaki et al. |
| 6,257,481 | B1 | * | 7/2001 | Shirzadi-Ghoshouni et al. ............................ 228/195 |
| 6,637,642 | B1 | * | 10/2003 | Lingnau ..................... 228/112.1 |
| 2008/0241572 | A1 | * | 10/2008 | Miyamoto et al. ............ 428/600 |
| 2010/0129684 | A1 | * | 5/2010 | Nakagawa et al. ........... 428/659 |

FOREIGN PATENT DOCUMENTS

| DE | 69807415 T2 | 4/2003 |
|---|---|---|
| EP | 0028763 A2 | 5/1981 |
| WO | WO 9631312 A1 * | 10/1996 |

OTHER PUBLICATIONS

English Translation of Koppe WO 96/31312 A1.*
ASM Handbook Committee; Welding and Brazing; Metals Handbook; 8th Edition, vol. 6; American Society for Metals, Metals Park, Ohio 44703.

* cited by examiner

*Primary Examiner* — Keith Walker
*Assistant Examiner* — Steven Ha
(74) *Attorney, Agent, or Firm* — Reising Ethington P.C.

(57) ABSTRACT

Aluminum alloy workpieces and/or magnesium alloy workpieces are joined in a solid state weld by use of a reactive material placed, in a suitable form, at the joining surfaces. Joining surfaces of the workpieces are pressed against the interposed reactive material and heated. The reactive material alloys or reacts with the workpiece surfaces consuming some of the surface material in forming a reaction product comprising a low melting liquid that removes oxide films and other surface impediments to a welded bond across the interface. Further pressure is applied to expel the reaction product and to join the workpiece surfaces in a solid state weld bond.

11 Claims, 4 Drawing Sheets

WELDING LIGHT METAL WORKPIECES BY REACTION METALLURGY

TECHNICAL FIELD

This invention relates to solid-state welding processes for joining workpieces of metal alloys such as aluminum alloys or magnesium alloys. A reaction product comprising a mobile low-melting temperature liquid-containing material is temporarily formed between joining surfaces. The mobile material is formed and used to prepare cleaned, oxide-free aluminum or magnesium surfaces. The cleaned surfaces are then pressed together to expel the reaction product and form a metal-to-metal bond without melting the facing surfaces. The process is practiced to manage consumption and deformation of the facing surfaces of the workpieces.

BACKGROUND OF THE INVENTION

Joining light metals such as aluminum alloys or magnesium alloys is complicated by the presence of rapidly forming oxide layers as well as their inherent high electrical and thermal conductivity. Spot welding of both of these alloy types is typically difficult and requires preparation of the workpiece surface, high currents, high forces, and mechanically well-aligned and stable electrodes. Short electrode lives are common because of reaction between the workpiece alloy and copper electrode. The resultant weld can have high strength, but poor high cycle fatigue performance under some conditions, particularly for magnesium alloys.

An alternative to obtain the large surface area, strong, stiff joint that is formed with this invention is structural adhesive bonding. This joining technique requires the use of an expensive adhesive along with specially coated substrates to prevent environmental degradation of joints. Adhesives are designed to cure in ovens used for curing paint, however, a fixturing method such as riveting or spot welding must be used in conjunction with the adhesive to temporarily secure the structure prior to adhesive cure as well as provide added structural performance after cure. These techniques require additional joining equipment. For riveting, a large inventory of expensive rivets is needed to join the various gauge combinations encountered in a structure. For spot welding, the coating and adhesive must be compatible with the welding process.

There remains a need for a process for forming large-area welds for aluminum alloy workpieces or magnesium alloy workpieces. Such a welding process could be of use, for example, in joining lightweight body panels or body structure components in making automotive vehicles. Such a welding process might also have utility in joining a galvanized steel component or aluminum-coated steel component to an aluminum or magnesium component.

SUMMARY OF THE INVENTION

Workpieces of metal alloys such as aluminum alloys and magnesium alloys are joined by a reaction metallurgy joining process. A solid state weld is formed by placing a layer of a suitable reactive material between the surfaces to be welded for the purpose of alloying with surface material and forming a transient, movable, liquid-containing reaction product (often a eutectic mixture) in-situ. The formation of this liquid phase serves to remove oxides and other barriers to solid state welding at the intended weld interface. The interface region of the assembled workpieces is heated to form the mobile reaction product but maintained at a temperature below the solidus temperature of the workpieces. Upon serving its surface preparation function, the reaction product is squeezed from the interface and the cleaned, heated, contacting solid surfaces are pressed together to form a solid-state weld.

The process may also be used to join aluminum-coated steel workpieces or zinc-coated steel workpieces to lightweight materials such as aluminum alloy workpieces or magnesium alloy workpieces.

The reaction metallurgy joining process may be used to weld many different workpiece forms. The facing surfaces may be provided, for example, by sheets, other wrought shapes such as extrusions (tubes or bars) and/or castings. For example, sheet metal panels may be joined to one another to make a closure panel. And tubular body frame members may be joined to cast corner or base members in making a vehicle structure. It will be seen that the process has utility in the construction of automotive vehicle members and other articles of manufacture.

The application of this reaction metallurgy joining process will first be described with respect to joining of workpieces of similar light metal alloys, for example the joining of an aluminum alloy sheet to another aluminum alloy sheet. Joining surfaces for the workpieces may first be cleaned of previous processing material, and other foreign material impeding good contact between the surfaces to be welded.

The subject reaction metallurgy joining process includes the placement of a layer of a reactive material, which may comprise a metal element or alloy, between the aluminum alloy sheet materials. This material, placed between and against joining surfaces, will be heated and used to react (typically diffuse into and alloy with workpiece elements) with the facing workpiece surfaces to form a reaction product that includes a suitable amount of a low-melting temperature liquid (i.e., the liquid is formed below the solidus of either facing workpiece). The reaction product is formed to remove oxides and other chemical impediments to a weld between the aluminum-based (or magnesium-based) material of the workpieces. In addition to liquid, the reaction product may include formed solids, or entrained solids, or the like, but the low-melting temperature liquid is a necessary part of the reaction product. The composition and amount of the interposed reactive material is predetermined to form a suitable amount of the liquid and of suitable fluidity for it to cleanse the surfaces and then to be squeezed (with any solids included with it) from the interface. This is accomplished at a temperature below the solidus temperature(s) of the workpieces. The reaction of the interposed reactive material with the workpiece surfaces thus removes material from the workpieces. This may change critical dimensions of the workpiece(s). Accordingly the amount of inserted reactive material is predetermined, such as by calculation, by experience, or by experiment, to prepare workpiece surfaces without excessive removal of workpiece material.

The inserted reactive material may be in the form of a thin sheet, wires, screens, flakes, or particles. In the embodiment of joining aluminum alloy workpieces, the added material is selected to contact and react with aluminum in the facing sheet surfaces to form a eutectic-like, low-melting-point phase(s). There are several elements that form low-melting-point liquids with aluminum, which has a melting point of 660° C. These include copper, silicon, zinc, and magnesium. The minimum solidus temperatures of binary alloys formed by aluminum and these elements are 548° C. for Cu—Al, 577° C. for Si—Al, 381° C. for Zn—Al, and 437° C. for Mg—Al. Alloys including these elements may be used as the reactive material provided a suitable liquid volume is formed at a temperature below the solidus temperature of the workpieces. For magnesium alloy workpieces there are a number of the same elements that form low-melting-point liquids with magnesium, which has a melting point of 650° C. These elements include copper, zinc, and aluminum. The minimum solidus temperatures of eutectic and near-to-eutectic alloy compositions formed by magnesium and these elements are 487° C. for Cu—Mg, 340° C. for Zn—Mg, 437° C. for Al—Mg. And alloys may be used as the reactive material that could include combinations of the workpiece base metal with the additive elements, e.g. Al—Si alloys or Al—Si—Cu alloys for joining aluminum alloy components. As another embodiment of the invention, mixtures of particles with distinctly different compositions which react to form a liquid containing phase could be used. A suitable mixture of copper and aluminum particles, for example, would produce a liquid that reacts with and wets aluminum joining surfaces, but produces a substantial amount of reaction product without consuming excessive amounts of the components to be joined.

In some embodiments of the invention, an aluminum-coated steel member or a zinc-coated (galvanized) steel member may be joined to a light metal workpiece. In such embodiments, the zinc or aluminum coating on the steel member may provide or contribute reactive material for cleansing the light metal workpiece surface and thus enable the formation of a solid-state weld between iron and aluminum or iron and magnesium surfaces.

In some embodiments of the invention, the joining face of one or both of the workpieces may be formed with surface features such as shallow pockets or cavities for holding interfacial reactive material. The cavities may be bounded by pads or projections for engaging a facing workpiece surface. These surface features of workpiece material are shaped to temporarily hold reactive material until the assembled workpieces are heated to commence the welding process. Then, the reactive material reacts with the workpiece surface features to form the reaction product with its low-melting-point liquid and level the workpiece surface for the weld.

The workpieces with interposed reactive material may be supported on suitable frames, fixtures, hangers, or the like. A heating apparatus and pressing apparatus are used to press the workpieces against the reactive material and the reactive material is heated to a temperature below the solidus temperatures of the workpieces but to a temperature suitable for promoting reactions forming the reaction product and for cleaning light metal surfaces. In many embodiments of the invention the assembled workpieces may be supported directly on mechanisms or apparatus for controlled heating and pressing of the workpieces. For example, suitably shaped heating blocks may be used to engage the back sides (i.e., non-joining sides) of the workpieces. Such heating blocks (which may, for example, be electrically resistance heated blocks) are shaped to engage the outward-facing workpiece surfaces, to press the joining faces of the workpieces against the co-extensively placed reactive material, and to conduct heat through at least one of the workpieces to the reactive material. But the practice of this invention is not limited to resistance heating. Many other heating means and energy imparting means may be used to heat the reactive material placed at the surfaces to be joined.

This reactive metallurgy practice is very useful for welding workpieces together over substantial surface areas. In accordance with this invention, the method is practiced to manage the dimensions of the welded article and to minimize distortion of the members at the welded interface. This may be of particular concern, for example, when the workpieces are sheet metal alloys having thicknesses of only a few millimeters or less. Such dimensional control is accomplished by controlling the amount of workpiece material consumed by the reactive material and discarded as reaction product as well as controlling the amount of deformation experienced by the workpieces during joining.

The temperature of the interface is closely controlled in the heating step to form the mobile reaction product while remaining below the solidus temperatures of the workpiece faces. For example, an AA6061 workpiece may have a solidus of about 582° C. while an aluminum-copper eutectic may melt at about 548° C. Thermocouples and temperature controllers may be used in controlling interfacial temperatures. And care is given to the application of pressure at the interface to minimize distortion of the weld region. An applied first pressure may be utilized to form reaction product for cleaning light metal surfaces and then a second pressure to displace the reaction product from between the cleaned faces. But the pressures and workpiece displacement are held to levels that minimize unwanted deformation of the cleaned, but heated, welding faces. Interfacial displacement may be controlled by servomotors, for example acting on heater blocks or by mechanical stops between the blocks.

Thus, the reactive metallurgy joining processes of this invention may be practiced to form solid-state welds between light metal surfaces over a wide range of surface areas. The processes are applicable to sheet-to sheet welds and to the formation of welds between many other wrought and cast workpiece shapes.

The above and other advantages and new, useful results of the present invention will become apparent to those skilled in the art from the following detailed description and accompanying drawings.

DESCRIPTION OF PREFERRED EMBODIMENTS

In many embodiments of this invention the process may be used to form solid-state welded interfaces between aluminum alloy workpieces or between magnesium alloy workpieces. Examples of aluminum-base alloys are AA5083 (solidus temperature of 574° C.), AA5454 (solidus 602° C.), and AA6061 (solidus 582° C.). Examples of magnesium-base alloys are AZ31 (solidus temperature of 605° C.), AM60 (solidus temperature of 540° C.), and ZK60 (solidus temperature of 520° C.). In other embodiments of the invention an aluminum-coated steel workpiece or a zinc-coated steel workpiece may be welded to an aluminum alloy or magnesium alloy workpiece.

Figure 1A:
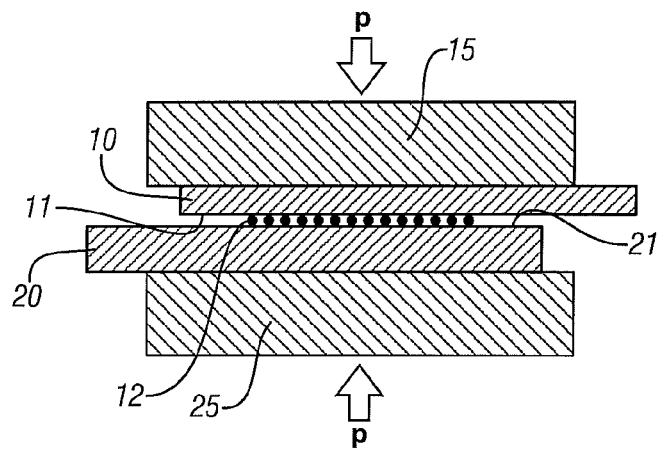
FIGS. 1A-1C show a schematic cross-sectional view of the process illustrating three stages in the development of the solid state joint. The sizes of workpieces and heating blocks are not necessarily drawn to scale but for illustration of embodiments of the welding process.
Figure 1B:
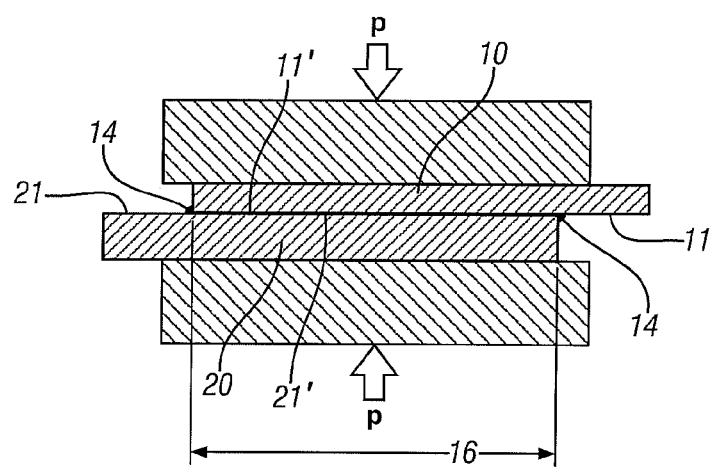
Figure 1C:
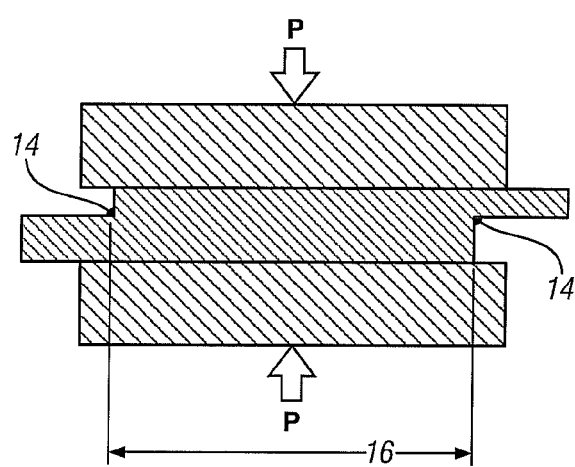

The process may often be used in welding sheets or other workpieces with relatively thin walls at the joint position. FIGS. 1A-1C are used to illustrate such embodiments.

In FIG. 1A, two metal workpieces 10 and 20, here shown in an overlapping configuration, are located between two support blocks 15 and 25 respectively with a layer of particulate reactive material 12 located between the intended bonding surfaces of workpieces 10, 20 to be welded. Where the workpieces are formed of an aluminum alloy(s) the reactive material may, for example be elemental copper, magnesium, silicon, and/or zinc. When the workpieces are formed of a magnesium alloy(s) the reactive material may be elemental aluminum, copper, and/or zinc. Or mixtures of these elements or alloys containing these elements may be used as the reactive material.

The depiction of a particulate form for the reactive material is not intended to be limiting. Alternate forms such as foil, wire, mesh or weaves could also be used although, as brought out more completely in later sections of this specification, material forms with irregular geometry such as particles, wires or weaves may offer advantages over foil in some specific embodiments. Reactive material 12 may be conveyed to the joint area manually or robotically as either a solid body or, particularly for particulate forms, entrained as a dispersion or a paste in a dispensable fluid which is either benign to the process or which will evaporate during processing. These procedures are well known to those skilled in the art of joining.

The workpieces are subject to a first pressure p applied through the support blocks and directed normal to the support blocks, sufficient to establish at least good mechanical contact between the contacting workpiece surfaces 11 and 21 and reactive material 12.

In FIG. 1B, the workpieces 10 and 20 and the particulate reactive material 12 have been heated, while still under pressure p, to a process temperature T sufficient for reactive material 12 to diffuse into or otherwise interact with the aluminum alloy composition or magnesium composition of surfaces 11 and 21 of the workpieces to form a reaction product 14. Reaction product 14 includes a low melting point liquid, incorporating the original reactive material and additional elemental components introduced by the reaction with and partial dissolution of the surfaces 11, 21 of workpieces 10, 20. This low melting temperature liquid may also comprise solid oxides and the like removed from surfaces 11 and 21. It will be appreciated that the particulate reactive material 12 will have been selected to be of such an initial composition that the addition of alloying elements from workpieces 10 and 20 will not raise the melting point of reaction product 14 to a temperature greater than the process temperature T. More preferably, the addition of further elements to reactive material 12 to create reaction product 14 will result in a further depression of the melting point of reactive material 12 such as would be observed in a ternary, quaternary or higher component eutectic alloy.

As stated, the reactive material 12 may be used in different and/or combined solid forms such as particles, wires, screens, sheets or films. But the composition and shape of the interposed material is selected to disrupt oxide films and other surface compositions on facing surfaces (such as surfaces 11, 21) of the aluminum alloy or magnesium alloy workpieces to be welded to form the fluid liquid-containing reaction product 14. More rapid formation of reaction product 14 may be promoted by additional mechanical disruption of oxide films occurring between the assembled facing surfaces 11 and 21 and interposed reactive material 12 during heating. This may be accomplished using mechanical motion or mechanical vibration which may be motions transverse to the joining surfaces and ultrasonic excitation which may be imposed in a convenient location remote from the weld zone and transmitted to the weld zone through support blocks 15 and 25.

Where one of the workpieces is an aluminum-coated or zinc-coated steel workpiece, the zinc or aluminum coating may constitute at least part of the reactive material 12 for reaction with a facing aluminum alloy or magnesium alloy workpiece. And the amount of reactive material is determined for suitably cleaning facing workpiece surfaces for a solid state weld with the removal of a determined amount of the thicknesses of the respective workpieces.

It is preferred that the fluidity of reaction product 14, with its liquid or liquid and solids, will result in its distribution, under applied pressure p, over the entire pressurized region of contact between workpieces 10 and 20 to create a reaction zone 16 which may be more extensive than the region over which particles of reactive material 12 were originally distributed.

The practice of the invention has been described when higher melting point reactive materials which are solid at reaction temperature T are employed. It will be appreciated that low melting point reactive materials which are liquid at reaction temperature T will be equally suitable.

As a result of the applied pressure p, the liquid reaction product 14 will have been partially expelled from the reaction zone 16, but, in the anticipated practice of the invention, a thin film of molten reaction product 14 will be present between oxide-free workpiece surfaces 11' and 21' preventing them from coming into contact with one another. More significantly, the thin film of molten reaction product 14 will prevent ingress of atmospheric oxygen into the reaction zone 16 and thereby enable continued freedom from oxidation of surfaces 11' and 21'.

In FIG. 1C, the joint configuration shown in FIG. 1B is subjected to a second pressure P, generally significantly greater than p, and sufficient to substantially fully expel reaction product 14 from the reaction zone 16, thereby enabling oxide-free workpiece surfaces 11' and 21' to achieve intimate contact while still at operating temperature T and hence generate a solid state bond in reaction zone 16 with remnant reaction product 14 at its periphery.

Finally the joined workpieces are allowed to cool to about room temperature and reaction product 14 permitted to solidify. The reaction product 14 may then be removed from the periphery of the weld zone.

It will be appreciated that with application of pressure p or pressure P, an associated displacement will result. As noted above, it is believed that this displacement associated with pressure p is beneficial in fracturing or rupturing oxide layers which would otherwise inhibit reaction. However displacement associated with pressure P may be detrimental since the pressure P will be applied to the heated regions of workpieces 10 and 20 in addition to reaction zone 16 where reactive material 12 has been transformed to reaction product 14. The heated regions will be softer than the adjacent cold regions and therefore may be more readily indented by support blocks 15 and 25. Any such impression will result in a thinning of the workpieces in the joint and may thus reduce its strength. Inasmuch as portions of workpieces 10 and 20 will already be unable to contribute to the joint due to their consumption in reacting with reactive material 12 and subsequent expulsion from the joint, further reduction in joint strength due to thinning may be undesirable.

The design requirements for the joint and of the metallurgy of the overall system—reactive material and workpieces—are considered and the process is practiced to limit thinning or deformation at the workpieces interface to a suitable extent. For example, consider the bonding of an aluminum sheet, 3 mm thick, to an identical sheet using copper foil as the reactive material and restricting the maximum loss of aluminum to 0.3 mm from each sheet. With these conditions and constraints, and knowing that the reaction product (14) formed will be an Al—Cu eutectic with a composition of about 34 wt. % copper, it is straightforward to compute that the thickness of the copper foil should be less than 0.091 mm. This of course assumes that foil of the desired thickness is readily available. Further, when considering more complex alloy systems the composition of the resulting reaction product (14) may not be known a priori. In consideration of both issues, it is desirable to identify an alternate approach.

Hence in a second embodiment of this invention rather than imposing a pressure P, it is preferred to impose a displacement δ, sufficient to achieve the desired solid state weld but intended to limit or minimize joint thinning. The practice of the invention will then call for a transition in control of the support blocks from load control (application of pressure, p) to displacement control (imposition of displacement, δ) as the process proceeds. Means for achieving this are well known to those skilled in the art.

FIG. 1 showed workpieces 10 and 20 of generally flat or smooth joining surfaces such as might be observed in rolled or extruded products. However, it is contemplated that this invention may also be practiced where a joining surface is formed with shallow depressions or recesses for holding reactive material and placement against a complementary facing joining surface of another workpiece. For example, cast products offer the opportunity to easily introduce shallow receptacles for temporarily retaining reactive material in an otherwise flat or featureless joining surface of a workpiece without requiring a separate machining step. And the low confining surfaces of the walls or sides of the receptacles conveniently provide aluminum alloy or magnesium alloy material for reaction with the placed reactive material.

Figure 2:
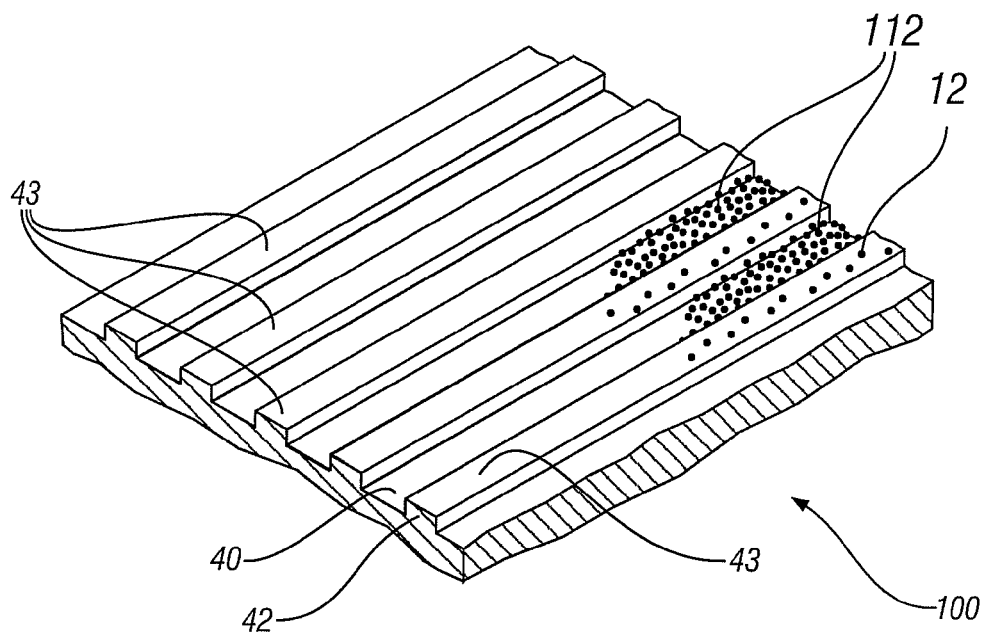
FIG. 2 shows a first embodiment of integral surface features which may be incorporated into a joining surface of one or both of the workpieces to receive reactive material and to enable better control of the overall joint thickness.

An example of such depressions or recessions is shown in FIG. 2. FIG. 2 is a fragmentary view of a workpiece with a portion of an intended joining surface of the workpiece. In this embodiment, the workpiece may be a cast object in which a joining surface portion 40 is formed with several parallel strips 42 projecting a small distance (e.g., a millimeter or so) above the intended normal level of the workpiece surface 40. Here joining surface 40 is part of a larger cast workpiece. Discrete particles (or wires or other shapes) of reactive material 12 are shown both on the upper surfaces 43 of strips 42 and, at 112, between the strips 42. When this workpiece is assembled against a second workpiece, surfaces 43 of strips 42 may initially engage the opposing joining surface. When the joining surfaces of the assembled workpieces are pressed together and the surfaces are heated, the reactive material 12 and 112 may react with the strip 42 material and with a facing surface to form a reaction product with its content of low melting point liquid. The strips 42 may be consumed in this reaction to provide more surface area for the weld to be formed between the workpieces. The amount of reactive material and the size and number of strips (or other depression confining material) is preferably predetermined to remove the strips and facilitate expulsion of the mobile reaction product.

Such distribution of reactive material 112 in depressions or cavities may be beneficial in many practices of the invention. The increased contact between reactive material and cavity surfaces may enhance interactions between reactant and workpiece joining surface. A greater surface area of the surface will be exposed to reactive material for removal of the surface oxide layer. And, even if not totally consumed by reactive material, any remnant surface projections may be deformed by pressure P to reduce overall deformation of a workpiece and to yield a generally flat interface capable of undergoing the desired solid-state bonding.

Figure 3:
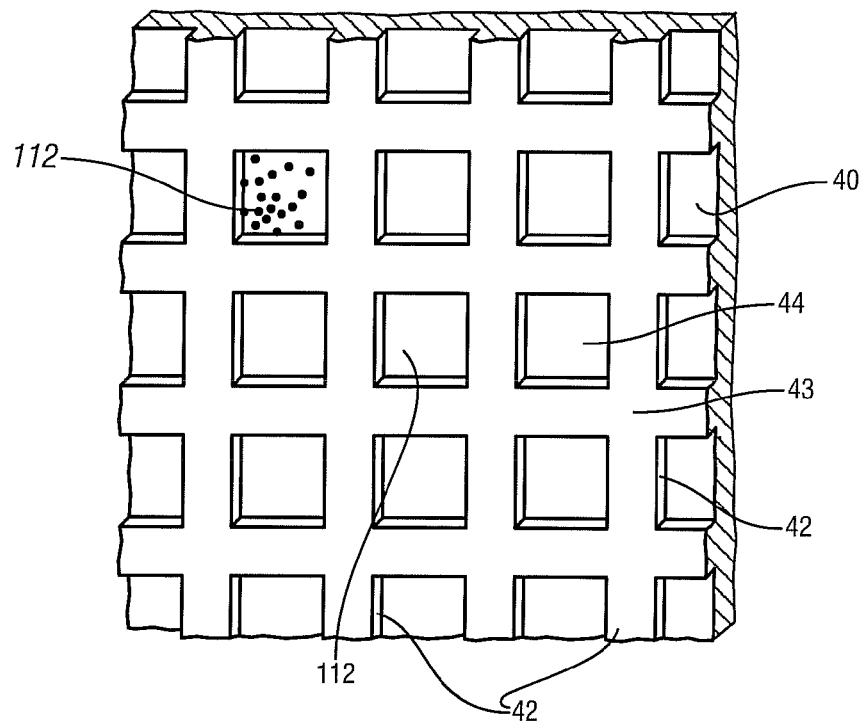
FIG. 3 shows a second embodiment of an integral surface feature which may be incorporated into one or both of the workpieces to receive reactive material and enable better control of the overall joint thickness.

FIG. 3 shows a further variant of such a workpiece joining surface in which criss-crossing strips or walls 42 are formed on a workpiece surface 40 to define shallow cavities 44 for containing reactive material particles 112. It will be appreciated that the upper surfaces 43 of strips, although depicted as flat may be fabricated with a range of topographies, particularly those topographies which may enable more effective rupture of the oxide layer on the opposing workpiece. These topographies include those that are produced by sand or grit blasting with high pressure air to provide a coarse, roughened surface texture.

The foregoing description is intended to describe a process applicable to a wide range of workpieces. The metal element or alloy compositions of the reactive material are determined based on the composition(s) of the aluminum alloy(s) or magnesium alloy(s) making up the joining surfaces of the respective workpieces and should be selected such that it satisfies the following criteria:

a. the solidus temperature of the reactive material (or individual component particle of a multi-component particle mixture) introduced into the gap between the pressurized region of the workpieces may be higher or lower than that of the workpieces. But the reactive material must, when reacted or alloyed with the workpieces, generate an alloy (reaction product) which has a solidus temperature lower than that of workpieces so that a process temperature T for forming the reaction product will not lead to excessive workpiece softening;

b. the alloy formed by reaction of the reactive material with the workpieces surfaces, when molten, must at least wet the workpieces surfaces in cleaning them of oxides and other impediments to the formation of a solid state weld between the cleaned surfaces. More preferably it will also wet the oxidized workpieces surfaces so that the molten alloy may spread and interact with the workpieces over the entire pressurized joining region;

c. the alloy formed at the conclusion of the process, when the maximum fraction of the workpiece has been dissolved and when the alloy may incorporate particles of the pre-existing workpiece oxide, should have a viscosity such that it may be substantially fully expelled from the gap between the workpiece pressurized region by the applied pressure P.

Subject only to the above specifications, this invention may be practiced on workpieces of similar composition e.g. aluminum alloys of identical or differing composition or alloy series; workpieces of dissimilar composition e.g. aluminum and magnesium, steel and aluminum among others; and coated materials, either to themselves or other alloys e.g. galvanized steel to anodized aluminum.

For zinc or aluminum coated steels the coating may be used as a portion of the reactive material. For other coated materials, the quantity and composition of reactive material 12 may be chosen to remove all of the coating, including any reaction products formed between the coating and the substrate. In special cases it may be possible to remove only a part of the coating if the bond between the coating and the substrate is sufficiently strong or if the beneficial effects of the coating are desired in the bond. It will, of course be appreciated that the bond between the substrate and the coating must itself be capable of solid-state welding. As examples; for an anodized coating on either aluminum or magnesium, complete removal of the coating would be desired; for a galvanized, galvannealed or aluminized steel where adherent interfacial layers are formed between the coating and the substrate it might be adequate to simply remove the surface oxide and promote adequate adherence with the interfacial layer.

Figure 4:
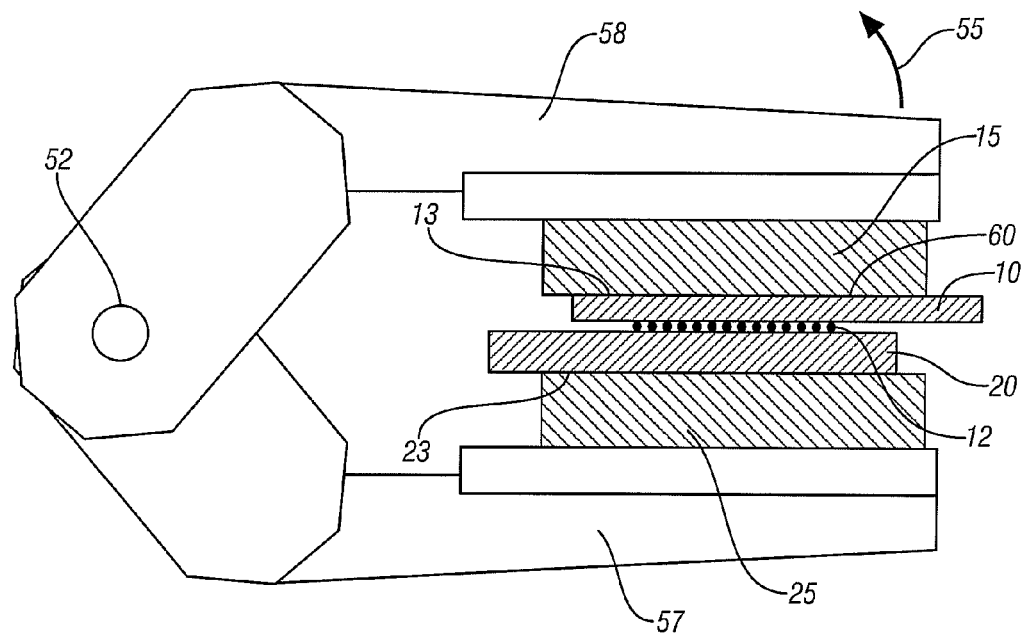
FIG. 4 is a schematic illustration of an apparatus (electrical resistance weld gun arms) for heating and applying pressure to the welding interface in an embodiment of the process to join metal components.

FIG. 4 shows another embodiment for practicing the invention and depicts the elements shown in FIG. 1 incorporated in a support frame which may be a spot welding servo gun. The configuration of mechanical features shown in FIG. 4 is exemplary only and should not be construed as limiting the scope of the invention which may be practiced using spot welding servo guns actuated in different manners as well as by devices and mechanisms other than spot welding servo guns. However the use of a spot welding servo gun is advantageous since the process requires a programmed application of forces and/or displacements—a capability readily available in current servo gun designs.

To fabricate a joint as described between workpieces 10 and 20 the following procedure would be followed:

position an appropriate quantity of reactive material 12 in the intended joint area;

open throat 60 to permit loading of workpieces 10 and 20 with particulate reactive material 12 therebetween. In the arrangement shown in FIG. 4 this would be accomplished by rotating moveable arm 58 about pivot 52 in direction indicated by arrow 55 until the gap 60 between moveable arm 58 and fixed arm 57 was sufficient to introduce the workpieces;

close throat 60 by rotating moveable arm 58 about pivot 52 in a direction opposite to that indicated by arrow 55 to enable support blocks 15 and 25 to contact the surfaces 13 and 23 of workpieces 10 and 20 and apply a pressure p;

heat the workpieces 10, 20 and particulate reactive material 12 to temperature T;

after a time sufficient to enable full reaction of particulate reactive material 12 with workpieces 10 and 20, apply increased force P—or, in an alternate embodiment, specified displacement δ—to expel reacted reaction product 14;

discontinue heating and;

open throat 60 to remove welded workpieces.

Heating may be accomplished using a variety of methods. For example, resistance heating may be used with support pads 15, 25 to pass a predetermined current for a predetermined time through the pressurized region. Alternatively the support pads may be externally heated, for example by the incorporation of cartridge heaters (not shown) with reliance on conduction to convey the heat to the workpiece interfaces 11 and 21—conductive heating. Finally it may be feasible to incorporate induction coils to use induction heating.

Similarly a number of approaches to cooling the workpieces following the creation of a joint between them may be adopted. Note that although reaction product 14 will still be molten at the conclusion of the process it contributes nothing to the joint strength which is entirely attributable to the solid state weld formed between substantially oxide-free surfaces 11' and 21'. Thus the simplest procedure is to simply remove the joined workpieces while still hot and allow them to air cool out of the tool. This may not be possible if the process temperature T is so high that the hot joint is unable to support handling or gravitational loads on the part. In this case the part could remain in the tool and air cool until the joint is strong enough. Alternatively the support plates 15 and 25 could incorporate cooling coils to circulate chilled water to more efficiently extract heat from the joint. Finally the part, if fully supported by other tooling and supports could remain in position with the throat 60 opened to disengage the support plates from the joint so that it could air cool or, alternatively, be subjected to enhanced cooling through air blast or water spray/mist cooling.

Figure 5:
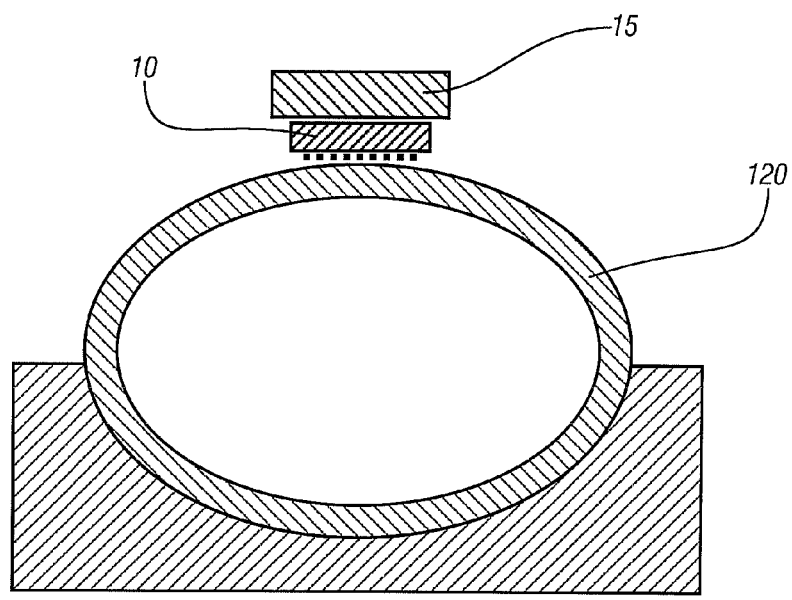
FIG. 5 is a schematic illustration of an embodiment of the process where the geometry of two workpieces to be welded inhibits or prevents two-side access for heating the welding interface.

In the process described previously, it was implied that the joint was readily accessible from both sides. While two-side access is broadly desirable, the process may also be practiced where access is more restricted. For example, FIG. 5 shows a situation where it may be desirable to attach a component to a closed section such as a tube. Provided the tube 120 is securely fixtured and provided it is possible to supply enough heat and pressure the process may still be practiced. In this example, support 15 could be mounted on a robot capable of generating the required pressures or displacements and heating would be accomplished from one side only.

Figure 6:
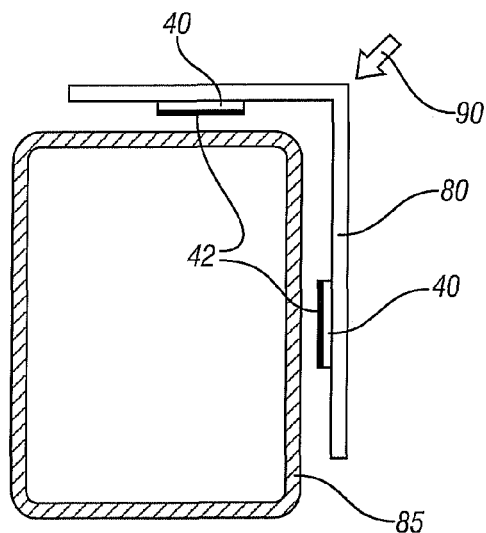
FIG. 6 illustrates an embodiment of the process where multiple joints between two members on non-parallel surfaces are to be formed.

FIG. 6 illustrates a similar situation but broadened to illustrate a situation where an L-shaped casting 80 incorporating features such as are shown in detail in FIG. 2, is to be attached to two surfaces of a closed rectangular section 85.

Note that the two joining surfaces 40 and associated projections 42 (like those illustrated in FIG. 2) are mounted orthogonally to one another and thus require that pressure(s) p and P be applied in the direction indicated by arrow 90 to ensure attachment on both surfaces. In this case the joints could be made simultaneously by using individual heat sources for each joint.

An example of a joint fabricated from aluminum sheets with copper foil as the reactive material was discussed previously, but as noted, the reactive material need not be a pure metal, and may be an alloy with a lower melting point than the workpieces.

Figure 7:
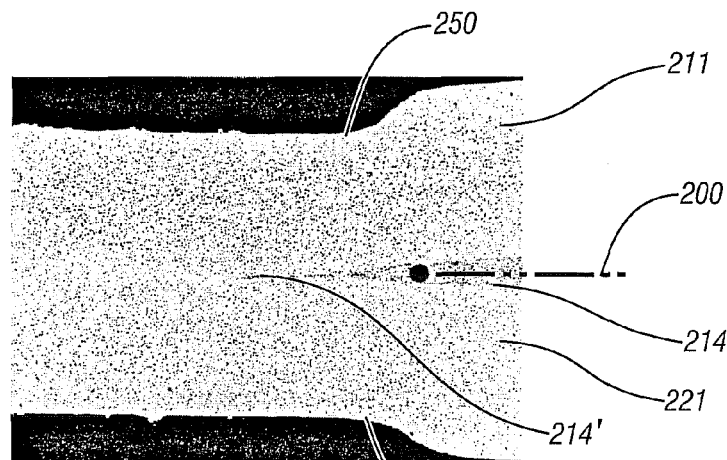
FIG. 7 shows a low magnification photomicrograph of a partial section of a weld made generally using the subject invention illustrating the joint, some entrapped braze alloy and expelled braze alloy.
Figure 8:
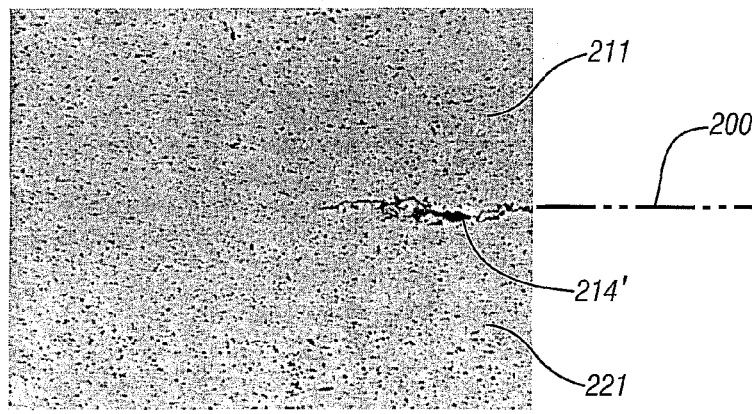
FIG. 8 shows a high magnification photomicrograph of a portion of the weld shown in FIG. 7 illustrating the joint and some entrapped braze alloy.

An experimental solid state bond formed between sheets of aluminum 3003-H14 alloy (solidus temperature approximately 640° C.) using an aluminum 4145 braze alloy (melting range 521-585° C.) and generally following the practice of the invention is shown in FIG. 7. Original workpieces 211 and 221 are welded along a line 200 and expelled alloy 214 is shown at the edge of the joint. Surface depressions associated with both the consumption of workpiece material by the reactive material and with the loads applied by the support blocks (not shown) are indicated as 250. It may be noted that complete expulsion of alloy 214 has not occurred and that a small pocket of remnant alloy 214' is shown trapped in the joint FIG. 8 shows a higher magnification view of the joint shown in FIG. 7 (remnant alloy 214' is commonly shown on both micrographs) illustrating that no interface between the workpieces 211 and 221 may be detected consistent with the practice of achieving a solid-state joint.

While preferred modes for carrying out the invention have been described in detail, those familiar with the art to which this invention relates will recognize various alternative designs and embodiments for practicing the invention within the scope of the appended claims.

The invention claimed is:

1. A method of forming a solid-state weld between a first joining surface of a first light metal alloy workpiece, the light metal being aluminum or magnesium, and a second joining surface of a second light metal alloy workpiece; the method comprising:

selecting, as a reactive material, a metallic element, or an alloy of two or more elements, or a mixture of two or more different elements or alloys, in a form to be placed between and in contact with the first joining surface and the second joining surface, the reactive material being selected to react with at least the first light metal alloy joining surface upon being heated to a temperature below the solidus temperature of the first light metal alloy to form a reaction product comprising a liquid comprising the reactive material and the light metal alloy element, and cavities are provided in one of the joining surfaces to hold the reactive material; the following steps being conducted at ambient conditions, preparing an assembly of the workpieces with their respective joining surfaces face-to-face and with at least one of the joining surfaces in contact with the reactive material, the amount of reactive material being predetermined to consume a specified amount of one or both workpieces in forming the reaction product;

pressing the assembly at a first pressure level so that the facing surfaces engage the reactive material, and heating the reactive material for a predetermined time to form the reaction product and consume portions of the facing workpieces, including consumption of surface alloy material defining the cavities;

increasing the pressure on the assembly to a higher pressure level to force substantially all formed reaction product from between the residual joining surfaces while limiting the displacement of the joining surfaces to a predetermined value; and, thereafter holding the joining surfaces against each other until a solid-state welded joint is formed substantially coextensively with the intended joining surfaces.

2. A method of making a solid-state weld as recited in claim 1 in which a first aluminum alloy workpiece is joined to a second aluminum alloy workpiece and a plurality of cavities are provided in one of the joining surfaces to hold the reactive material and the reactive material comprises at least one metal element selected from the group consisting of copper, magnesium, silicon, and zinc.

3. A method of making a solid-state weld as recited in claim 1 in which a first magnesium alloy work piece is joined to a second magnesium alloy workpiece and a plurality of cavities are provided in one of the joining surfaces to hold the reactive material and the reactive material comprises at least one metal element selected from the group consisting of copper, magnesium, silicon, and zinc.

4. A method of making a solid-state weld as recited in claim 1 in which both workpieces are light metal alloy sheets having a thickness in the range about three-quarters of a millimeter to about four millimeters and the amount of reactive material is predetermined to consume no more than about ten percent of the thickness of the thinner of the two sheet workpieces.

5. A method of making a solid-state weld as recited in claim 4 in which the workpieces are aluminum alloy sheets and the reactive material comprises copper.

6. A method of making a solid-state weld as recited in claim 1 in which the first light metal alloy workpiece is formed by casting the first light metal alloy and the joining surface of the cast first light metal alloy workpiece is thereby initially formed with cast-in-place cavities for holding the reactive material, the reactive material, when heated, reacting with joining surface alloy material defining the cavities in forming the reaction product.

7. A method of making a solid-state weld as recited in claim 1 further comprising:

forming cavities for reactive material in the joining surface of at least one of the workpieces and placing reactive material in the cavities and on the joining surface around the cavities, and preparing an assembly of the workpieces so that the reactive material, when heated, reacts with joining surface alloy material defining the cavities in forming the reaction product, the combination of the applied pressure and the reaction of the reactive material acting to level the workpiece surface for the solid-state welded joint.

8. The method of claim 1 wherein the first predetermined period of time is established as the time necessary for the reaction product to remove metal oxides from the facing workpiece surfaces.

9. The method of claim 1 where the assembly is pressed and heated using a welding servo gun.

10. The method of claim 1 where the assembled workpieces are heated by at least one of resistance heating, conductive heating and induction heating.

11. The method of claim 1 where the assembled workpieces are subjected to mechanical motion, mechanical vibration, or ultrasonic excitation transverse to the joining surfaces to promote formation of the reaction product.

* * * * *